J. L. YOST.

Assignor, by direct and mesne assignments, to the SPRINGFIELD BICYCLE MANUFACTURING COMPANY.

BICYCLE.

No. 10,864. Reissued Sept. 6, 1887.

Witnesses,
Jas. J. Maloney
M. E. Hill.

Inventor
Joseph L. Yost,
by Jos. P. Livermore
Att'y.

N. PETERS, Photo-Lithographer, Washington, D. C.

UNITED STATES PATENT OFFICE.

JOSEPH L. YOST, OF CHICOPEE, ASSIGNOR, BY DIRECT AND MESNE ASSIGNMENTS, TO THE SPRINGFIELD BICYCLE MANUFACTURING COMPANY, OF BOSTON, MASSACHUSETTS.

BICYCLE.

SPECIFICATION forming part of Reissued Letters Patent No. 10,864, dated September 6, 1887.

Original No. 334,325, dated January 12, 1886. Application for reissue filed June 7, 1887. Serial No. 240,560.

*To all whom it may concern:*

Be it known that I, JOSEPH L. YOST, a citizen of the United States, residing at Chicopee, Massachusetts, have invented new and useful Improvements in Bicycles, of which the following is a specification.

This invention relates to means for propelling vehicles of the kind in which the motive power is supplied by the rider, and particularly to means for propelling what are known as "vertical-fork" bicycles. Heretofore these have usually been driven by cranks connected directly with the axle of the larger wheels, or by some other means which require a downward and forward movement of the legs of the operator. This manner of driving, coupled with the strain which is exerted on the handle of the machine to prevent the rider or operator from falling backward, renders him extremely liable to be thrown forward when an obstruction is met.

The objects of the present invention are, first, to produce a driving mechanism to which the power may be applied by a direct downward thrust of the limbs, and by this means the weight of the body is utilized in propelling the machine.

Second. The object is to provide a driving mechanism in which the power exerted may be multiplied to any suitable degree.

Third. The invention consists in improved means for securing the gear-wheels through which the axle receives motion upon the said axle in such manner that the power exerted will have a tendency to tighten the said gear-wheels upon the axle; and, finally, the invention consists in certain novel details of construction whereby the objects of the invention are accomplished, the operation of the device rendered certain, and the stability of the driving mechanism secured.

In order that those skilled in the art to which my invention appertains may know how to make and use the same, I will now proceed to describe it in connection with the accompanying drawings, in which—

Figure 1:
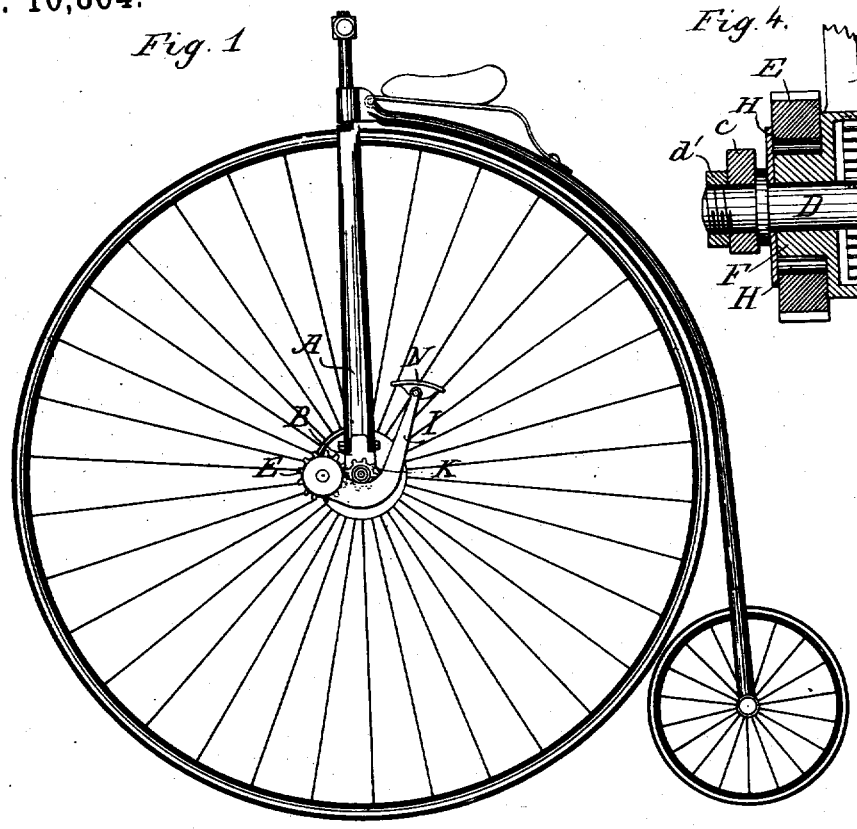
Figure 4:
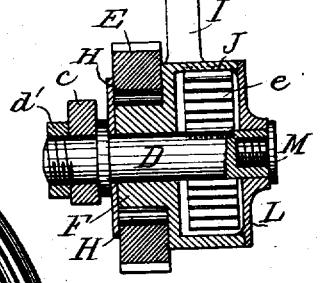
Figure 2:
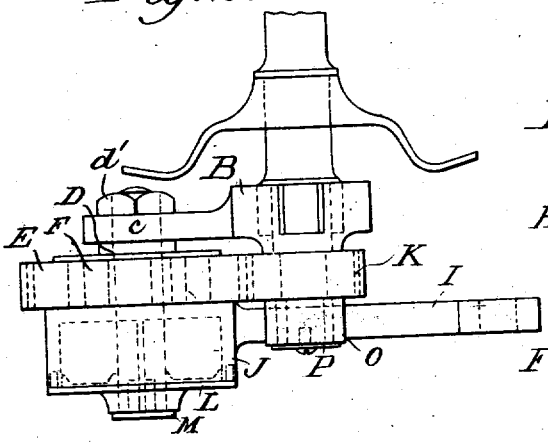
Figure 3:
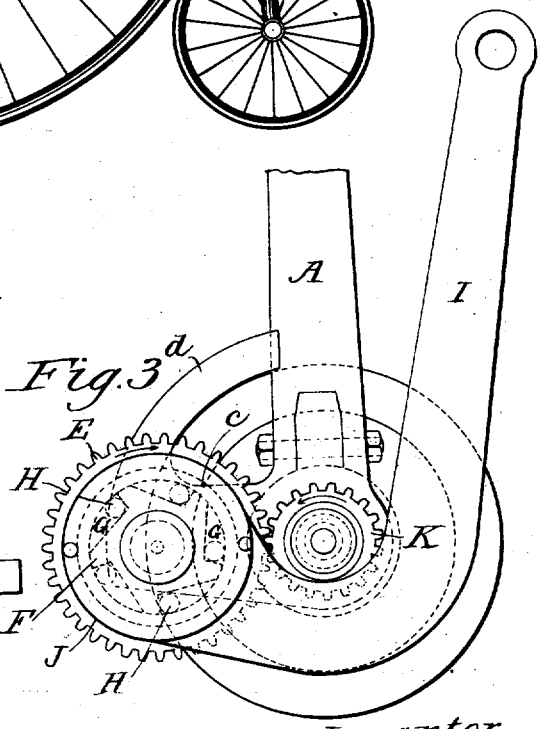

Figure 1 represents a side view of a vertical-fork bicycle with my invention applied; Fig. 2, a plan view of the driving mechanism. Fig. 3 represents a side elevation of the operating mechanism, partly in dotted lines, representing the interior parts; and Fig. 4, a vertical section of the driving mechanism.

In the drawings, A represents the lower portion of one side of the fork of the bicycle, and B represents a casting, of any suitable metal, which is provided with a circular opening for the passage of the axle of the large wheel, and is also provided with an upward projection, upon which the fork of the bicycle rests, and to which it is secured by a suitable bolt or pin. This casting is provided, also, with a forward extension, *c*, which supports the bearing for the operating-lever, and by which the mechanism which communicates motion from the operating-lever to the wheel is carried, as will be fully set forth hereinafter. As a convenient means for strengthening this casting and to prevent its being depressed by the force exerted upon it by the lever in propelling the vehicle, I provide the said casting with an upwardly-extending curved projection, *d*, which is rigidly secured by any desired means to the fork of the bicycle, and by this means the bearing upon which the lever is mounted is secured permanently in place.

D represents a pin, which is attached by a suitable nut, *d'*, to the forward extension, *c*, of the piece B, which forms a part of the rigid frame-work of the bicycle. Upon said pin D is supported the operating-lever I, which has rigidly connected with it or formed as an integral part of it, on the side next to the frame-piece B, a disk, F, provided with a series of notches, G, which decrease in width from the center, and in these notches are retained a series of rollers or balls, H. Mounted upon the said disk F is a gear-wheel, E, made in the form of an annulus, or having an opening that incloses the notched disk F and the rollers contained in the notches in the said disk, which rollers, when moved toward the shallower part of the notches, thus bear against the inside of the gear and frictionally connect it with the notched disk and lever, so that when the lever is pressed down the rollers will clutch the gear to it and cause the said gear to turn; but when the lever moves up the rollers will be carried to the deeper part of the notches in the disk, where they will not bind on the gear, which can continue its rotation while the lever moves up freely. The said lever I also has rigidly connected or made integral with it a cylinder, J, extending outward away from the frame-piece B, which contains the retracting-spring *e*, hereinafter described.

The movement of the gear-wheel E is communicated to the wheel through the medium of the gear-wheel K, fixed upon the axle of the wheel. The relative sizes of the gears E and K may be changed at will, and in this way the speed of the gear K may be multiplied to any suitable degree, consistent with a reasonable amount of driving-power, relative to the gear E. The cylinder, formed with the operating-levers I, is retained in proper position by means of a circular plate or cap, L, which is fastened upon the end of the pin D by means of a nut, M.

With a view to fastening the gear-wheels upon the axle in a cheap and simple way, and so that they are rendered incapable of moving out of the position which they are designed to occupy, I provide the said axle with threads upon its ends, the right-hand end being provided with a right-hand screw and the left-hand end being provided with a left-hand screw, and thus it will be seen that the force exerted to propel the bicycle will tend to tighten the gears upon the axle. The operating-levers I extend upward and rearward from their points of support, and they are provided at their ends with pedals N, of suitable form, and these pedals are situated directly beneath the saddle, so that the thrust of the leg, by which the bicycle is propelled, is made in a downward direction, and the weight of the body of the rider may thus be utilized to advantage. The operating-lever is returned to its normal position, after being depressed and relieved from pressure by the foot, by means of a coil-spring, *e*, contained in the cylindrical portion J. One end of this spring is connected to the pin D and the other end is connected to the inside of the cylinder in any suitable manner. A downward movement of the operating-lever contracts this spring, and the resiliency thereof returns the lever to its normal position when pressure is removed from the lever. The operating-lever in its normal position rests against the outer end of the axle, and in order that the blow of the said lever upon the axle as the lever returns to its normal position may be deadened, I provide the said axle with a rubber sleeve, O, which is mounted upon a freely-revolving metal sleeve retained in place by a disk, P, against which the lever strikes when returning to its normal position.

Having thus described my invention, what I claim as new, and desire to secure by Letters Patent, is—

1. The herein-described operating devices, consisting of the combination, with a fork and axle of a bicycle, of the casting provided with a forward projection, the operating-gears provided with clutch mechanism and mounted in the forward end of said projecting casting, the operating-lever extending rearward to a point within a vertical plane dropped from the saddle, and a gear mounted upon the axle of the bicycle and meshing with the gear at the forward end of the projecting casting, the relation of the parts being such, as described, that the foot end of the operating-lever shall move up and down in a vertical plane dropped from the seat or saddle.

2. The combination, with the fork and axle of the bicycle, of the casting provided with a forward extension having mounted thereon the clutch consisting of an annular gear, the disk provided with inclined notches, the rollers in said notches co-operating with the inner surface of the said gear, the operating-lever connected with said notched disk, the cylinder connected with the said lever, and retracting-spring for said lever contained within the said cylinder, substantially as described.

3. The combination, with the bicycle, of the casting carrying the gear and clutch and operating-lever, and the axle provided with a gear, and the rubber sleeve against which the operating-lever bears.

4. The combination, with a bicycle, of the casting carrying the gear-clutch and operating-lever, and the axle provided with the gear and freely-revolving metal sleeve carrying the rubber sleeve, substantially as described.

In testimony whereof I have signed my name to this specification in the presence of two subscribing witnesses.

JOS. L. YOST.

Witnesses:
JOS. P. LIVERMORE,
M. E. HILL.